United States Patent Office 3,647,859
Patented Mar. 7, 1972

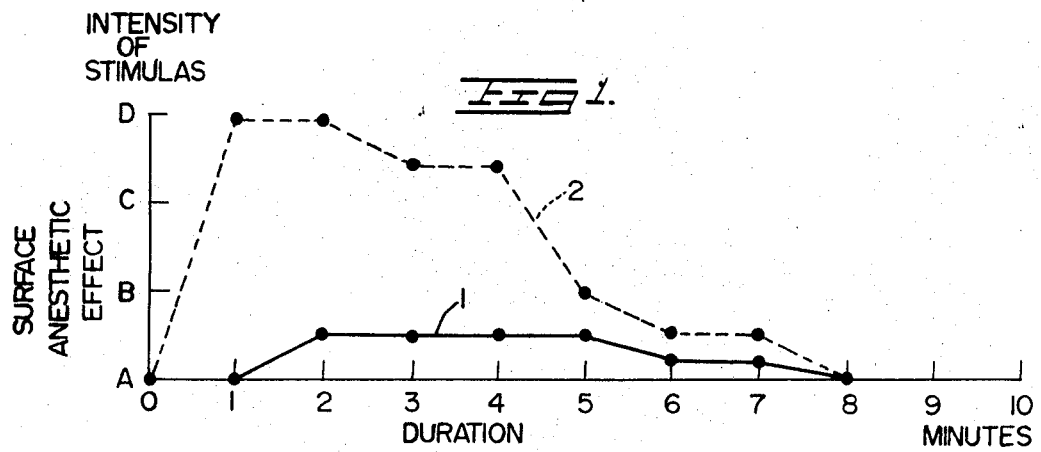
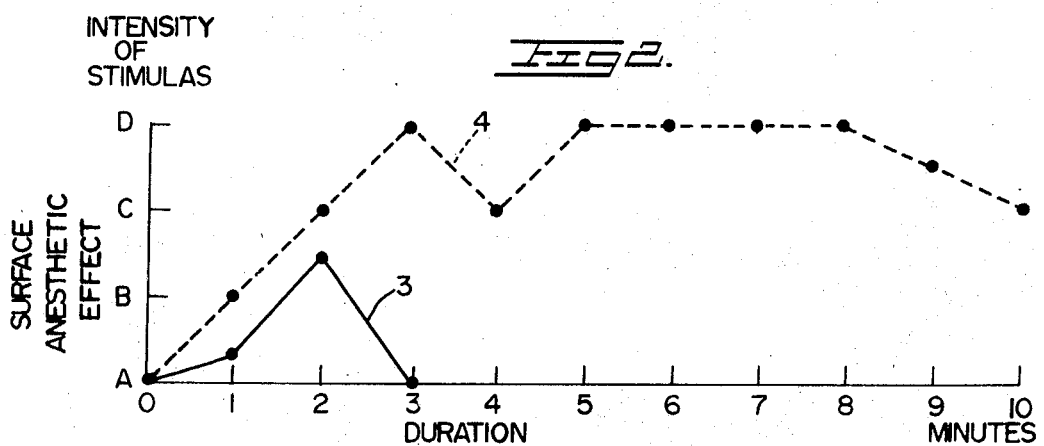
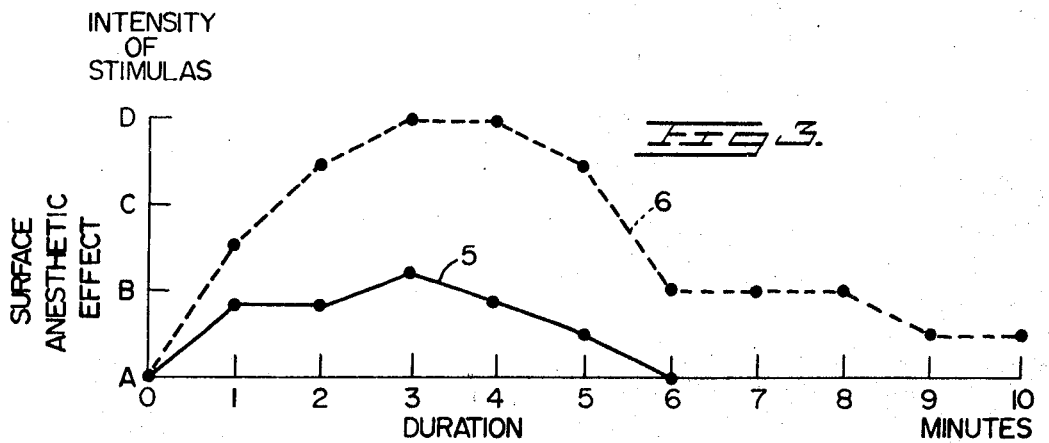

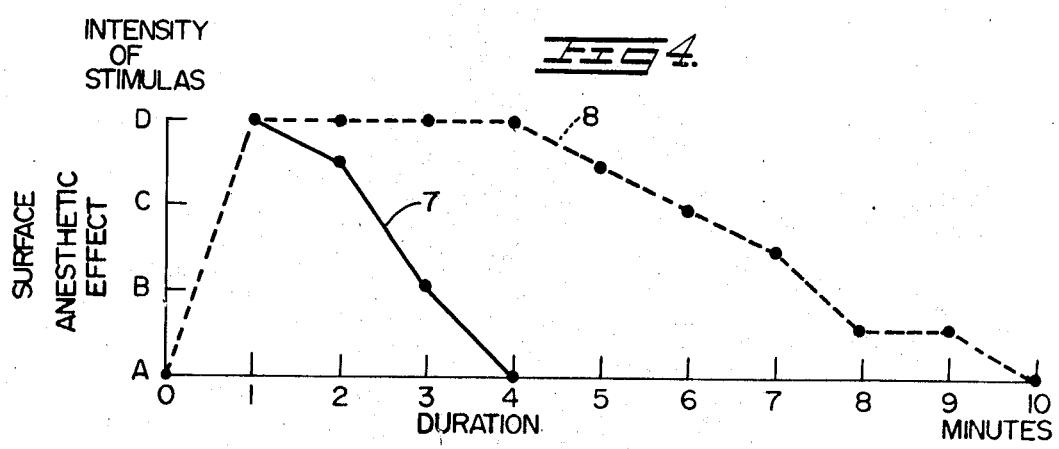
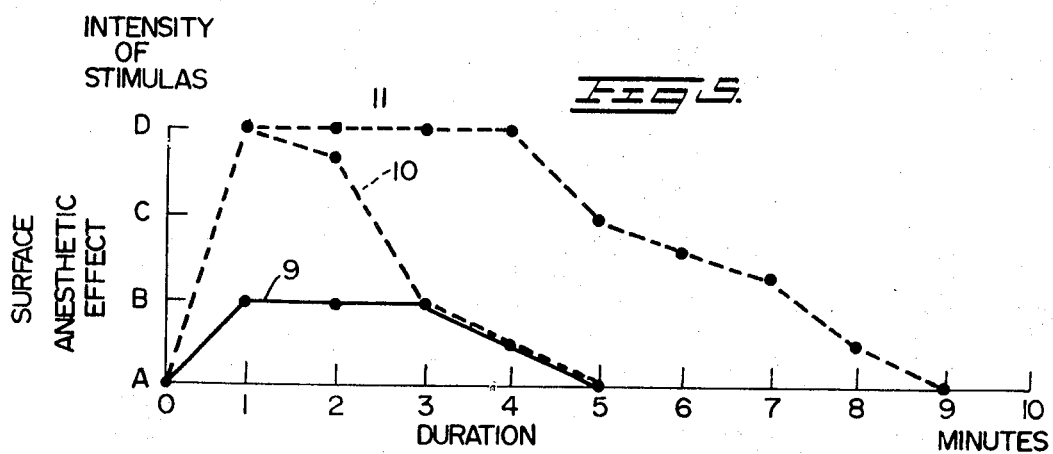
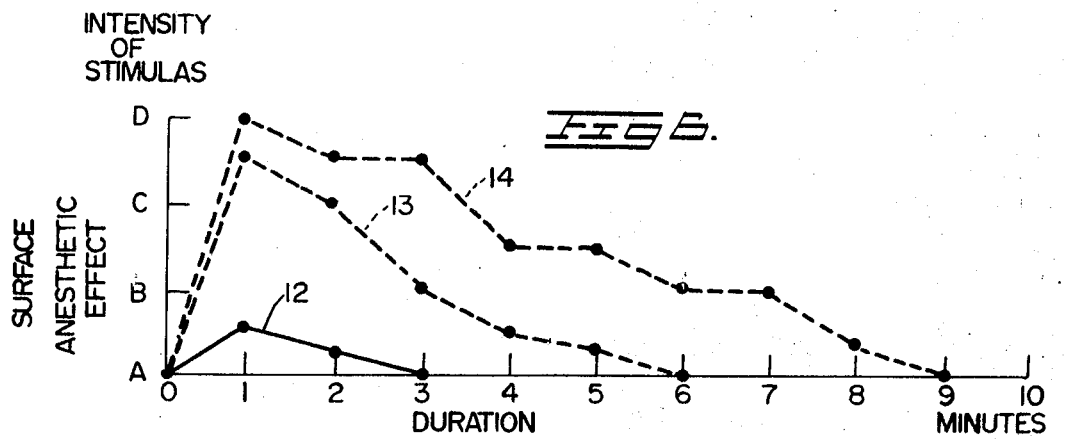

---

3,647,859
AMINOALCOHOL DERIVATIVES
Haruo Ogura, 130 Shirokane Sankocho, Shiba,
Tokyo, Japan
Filed Apr. 23, 1968, Ser. No. 723,506
Claims priority, application Japan, Apr. 29, 1967,
42/27,490, 42/27,491
Int. Cl. C07c 93/16, 93/24
U.S. Cl. 260—473 R      2 Claims

ABSTRACT OF THE DISCLOSURE

A novel aminoalcohol derivative having a high narcotic effect and weak toxicity, as represented by the formula:

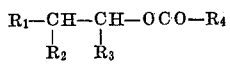

wherein $R_1$ represents either a cyclohexylamino group or diethylaminoethylamino group; $R_2$ and $R_3$ represent dissimilar radicals selected from the group consisting of a methyl group and hydrogen; and $R_4$ represents either a phenyl group, methoxyphenyl group, or ethoxyphenyl group, but when $R_1$ is a cyclohexylamino group and $R_2$ is a hydrogen atom, $R_4$ represents either a methoxyphenyl group or ethoxyphenyl group, and a process for preparing the same by subjecting cyclohexylamine or diethylaminoethylamine to reaction with propylene oxide to form an aminoalcohol and then benzoylating the resulting aminoalcohol.

BRIEF SUMMARY OF THE INVENTION

This invention relates to an aminoalcohol derivative as represented by a following structural formula:

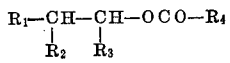

wherein $R_1$ represents either a cyclo hexylamino group or diethylaminoethylamino group; $R_2$ and $R_3$ represent dissimilar radicals selected from the groups consisting of methyl group and hydrogen atom; and $R_4$ represents either a phenyl group, methoxyphenyl group or ethoxyphenyl group, but when $R_1$ is a cyclohexylamino group and $R_2$ is a hydrogen atom, $R_4$ represents a methoxyphenyl group or ethoxyphenyl group, and further relates to a process for preparing said aminoalcohol derivative.

An object of the present invention is to provide a local anesthetic having a high narcotic effect.

Another object of the present invention is to provide a local anesthetic having a less toxicity and having a considerably durable narcotic effect.

A further object of the present invention is to provide a local anesthetic having no habitualness.

A still further object of the present invention is to prepare a local anesthetic according to a simple process.

Other objects and advantages of the present invention will become apparent from the description hereinafter disclosed.

BRIEF DESCRIPTION OF THE DRAWING

The accompanying drawings are to illustrate the narcotic effect of the present invention, and FIGS. 1–4 show relationships between surface anesthetic effects and duration times of anesthesia of:

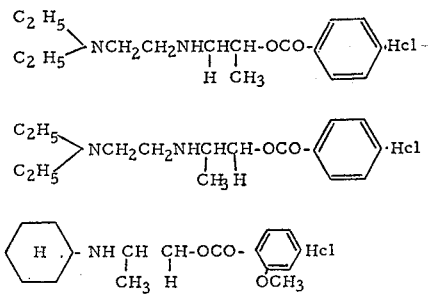

and

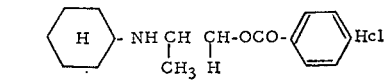

respectively, and FIGS. 5 and 6 show relationships between surface anesthetic effects and duration times of anesthesia of:

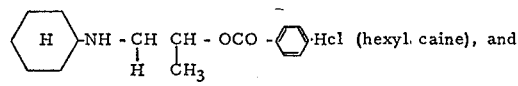

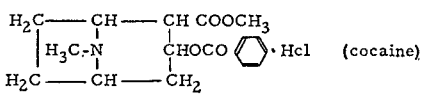

which are selected in order to compare the present anesthetics with the conventional ones.

BACKGROUND OF THE INVENTION

Among anesthetics of derivatives similar to those of the present invention, xylocaine, hexylcaine, etc. have been heretofore well known. However, there are such disadvantages that hexylcaine has a high toxicity, though its narcotism is great, and xylocaine has a poor narcotism and a high toxicity. As the conventional process, for example, for preparing hexylcaine, such a process has been conducted, which comprises preparing 1-cyclohexylaminopropane-2-ol according to a following formula:

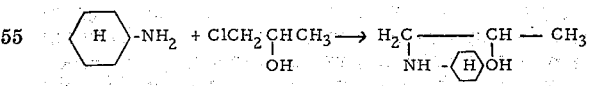

and benzoylating the 1-cyclohexylaminopropane-2-ol and hydrochlorinating the resulting benzoylated product. However, according to said process, monochloroisopropanol must be synthesized from isopropanol and thus the synthesis steps have been very complicated and the process itself has been uneconomical.

DETAILED DESCRIPTION OF THE INVENTION

The present local anesthetic has the following structural formula

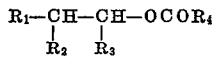

wherein $R_1$ is either a cyclohexylamino group or diethylaminoethylamino group, $R_2$ and $R_3$ are dissimilar radicals selected from the group consisting of a methyl group and hydrogen atom, and $R_4$ is either a phenyl group, methoxyphenyl group, or ethoxyphenyl group, but when $R_1$ is a cyclohexylamino group and $R_2$ is a hydrogen atom, $R_4$ is a methoxyphenyl group or ethoxyphenyl group. Illustration of structural formulae of typical derivatives and comparison of surface anesthetic effects and acute toxicites of the present anesthetics with those of the conventionally well known xylocaine hexylcaine and cocaine are given in the following table and figures.

a degree as the stimulating hair touches the eyes and is slightly bent, and the intensity D is a stimulus to such a degree as the stimulating hair touches the eyes and is extremely bent.

The acute toxicity test is a counting of numbers of living mice and dead mice of dd species after 72 hours of intravenous injection according to Litchfield-Wilcoxon method.

The ordinates in the figures show the surface anesthetic effect as an intensity of stimulus, and the abscissas show the duration (minute). In FIG. 1, numerals 1 and 2 are the cases where

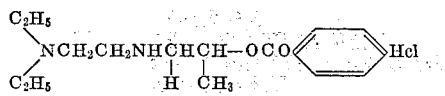

is injected in amounts 1.5 and 5.0 mg./ml., respectively. In FIG. 2, numerals 3 and 4 are the cases where

TABLE

| No. | Compounds | Surface anesthesia | $LD_{50}$ (mg./kg., i.v.) |
|---|---|---|---|
| 1 |  (Hexylcaine) | 1.00 | 23.0 |
| 2 |  | 0.13 | 24.5 |
| 3 |  | 0.10 | 40.0 |
| 4 |  | 0.10 | 50.0 |
| 5 |  | 5.00 | |
| 6 | 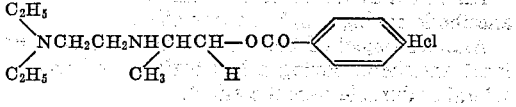 | 5.00 | 27.0 |
| 7 |  | 0.33 | 35.0 |
| 8 | CH₂——CH——CH—COOCH₃<br>    |                |<br>    CH₃·N   CHO·CO—⟨phenyl⟩·HCl<br>CH₂——CH₂——CH₂<br>(Cocaine) | 7.14 | 17.5 |
| 9 | (C₂H₅)₂NCH₂CONH—⟨2,6-diMe-phenyl⟩·HCl<br>(Xylocaine) | 0.10 | 27.5 |

The effect of surface anesthesia in the table and figures is a result obtained by dropping 0.05 ml. of solution having a given concentration in the eyes of a rabbit, giving stimuli having various intensities A, B, C and D to the eyes with a stimulating hair and comparing the respective minimum effective concentrations for vanishing the nictitating reflax. In the table, the case of hexylcaine is shown as a base (1.00).

The intensity A is a stimulus to such a degree as the stimulating hair slightly touches the eyes, the intensity B is a stimulus to such a degree as the stimulating hair just touches the eyes, the intensity C is a stimulus to such $(C_2H_5)_2NCH_2CH_2NHCHCH-OCO-\text{(phenyl)}\cdot HCl$ with CH₃ and H substituents is injected in amounts of 0.1 and 1.0 mg./ml., respectively. In FIG. 3, numerals 5 and 6 are the cases where ⟨H-phenyl⟩—NHCH—CH₂—OCO—⟨OCH₃-phenyl⟩·HCl with CH₃ and H substituents is injected in amounts of 4.5 and 5.0 mg./ml. In FIG. 4, numerals 7 and 8 are the case where

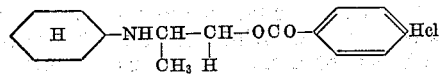

is injected in amounts of 4.0 and 6.0 mg./ml., respectively. In FIG. 5, numerals 9, 10 and 11 are the cases where

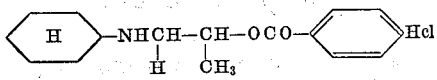

is injected in amounts of 0.8, 2.0 and 5.0 mg./ml. respectively. In FIG. 6, numerals 12, 13 and 14 are the cases where

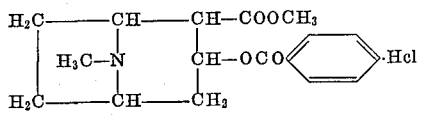

is injected in amounts of 0.07, 0.1 and 1.0 mg./ml. respectively.

It is seen from the foregoing table and figures that the present aminoalcohol derivatives have a narcotic property and less toxicity, those narcotic effect and duration are equal or superior to those of xylocaine and hexylcaine, and some kinds of them have similar effects to cocaine.

The present aminoalcohol derivatives can be used for the local anesthesia in the forms of hydrochloride, hydrobromide, oxalate, maleate, fumarate, tartarate, citrate and phthalate, but the narcotic effect even of the same derivative is varied, as shown in No. 5 of the table, depending upon the kind of the acids. Thus, it is desirable to suitably select the kind of acids according to the kind of aminoalcohol derivatives.

The present aminoalcohol derivatives can be prepared by reacting cyclohexylamine or diethylaminoethylamine with propylene oxide on heating in the presence or absence of a Lewis acid catalyst, distilling the resultant product to obtain aminoalcohol, and then benzoylating the aminoalcohol according to the conventional benzoylation method. However, the process for its preparation depends upon the allocation of $CH_3$ group to any of $R_2$ and $R_3$ represented by the above-mentioned structural formula. When the amines are hexylamine or diethylaminoethylamine, said amines and propylene oxide are placed in an autoclave and subjected to reaction on heating in the absence of a catalyst, the compounds having $CH_3$ for $R_2$ and H for $R_3$ can be obtained. The reaction time can be shortened by irradiating the reactants with ultraviolet rays. However, when said reaction is carried out in the presence of Lewis acid catalyst, the compounds having H for $R_2$ and $CH_3$ for $R_3$ can be obtained. As a Lewis acid catalyst, $BF_3$, $AlCl_3$, $ZnCl_2$, $SnCl_2$, $FeCl_3$, organic acid, inorganic acid, etc. are used.

In any reaction, it is rather preferable to use a slightly excessive propylene oxide than to add amines and propylene oxide in equimolar amounts to the reaction system in preparing aminoalcohol. Further, the reaction temperature must be varied somewhat depending upon the kinds of amines, but is in the range of 60 to 150°, preferably 80 to 120° C. The reaction rate is very low at a temperature below 60° C. and thus the use of such a temperature is uneconomical. On the other hand, a temperature higher than 150° C. is not preferable, because propylene oxide has a danger of explosion. When ultraviolet rays are irradiated in the reaction, both direct irradiation or indirect irradiation can serve the purpose, and a wave length of about 220 to about 400 m$\mu$ is preferable. When the ultraviolet rays having such a wave length is irradiated, the reaction time can be shortened to about one-half to about one-tenth of the non-irradiated reaction time. Further, when a Lewis acid is used as a catalyst, the amount of a catalyst to be added is about 1/10 to about 1/100 mole on the basis of one mole of amines. Then, the preparation of a derivative from aminoalcohol is carried out a conventional benzoylation procedure of aminoalcohol.

EXAMPLE 1

To 0.1 mole of cyclohexylamino was added 0.12 mole of propylene oxide, and the mixture was placed in a quartz autoclave which was then tightly sealed. The autoclave was heated with a boiling water bath for 8 hours while ultraviolet rays were irradiated. After the reaction, the reacted mixture was distilled, whereby 0.07 mole of 2-cyclohexylaminopropane-1-ol was obtained. The boiling point and melting point of the product were 123–125° C. (20 mm. Hg vacuum) and 42–45° C., respectively. Then, 0.12 mole of O-methoxybenzoyl chloride was added to 0.1 mole of said 2-cyclohexylamino-1-ol and the benzoylation was conducted, whereby 0.08 mole of a compound of

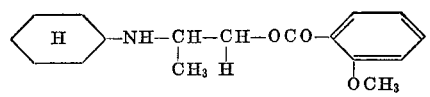

was obtained. The boiling point of the compound was 190–195° C. (6 mm. Hg vacuum), [NMR 6.6$\tau$ (multiplet, $>CH-$)], and the melting point of its hydrochloride was 200° C.

EXAMPLE 2

To 0.1 mole of cyclohexylamino was added 0.12 mole of propylene oxide, and the mixture was placed in a quartz autoclave which was then tightly sealed. The autoclave was heated with a boiling water bath for 8 hours while ultraviolet rays were irradiated. After the reaction, the reacted mixture was distilled, whereby 0.07 mole of 2-cyclohexylaminopropane-1-ol was obtained. Then, 0.12 mole of p-ethoxybenzoyl chloride was added to 0.1 mole of 2-cyclohexylaminopropane-1-ol. Benzoylation was then conducted, whereby 0.08 mole of

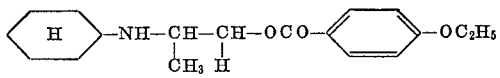

was obtained. The boiling point of this compound was 195–200° C. (6 mm. Hg vacuum), [NMR 6.4$\tau$ (multiplet, $>CH-$)], and the melting point of its hydrochloride was 218–220° C.

EXAMPLE 3

To 0.1 mole of diethylaminoethylamine was added 0.12 mole of propylene oxide, and the mixture was placed in a glass autoclave which was then tightly sealed. The reaction was conducted at 100° C. for 8 hours. Then, the product mixture was distilled, whereby 0.06 mole of 2-N,N diethylaminoethylaminopropane-1-ol was obtained. The boiling point of the product was 140–145° C. (8 mm. Hg vacuum). Then, 0.1 mole of this product was benzoylated according to the conventional method, whereby 0.065 mole of a compound of

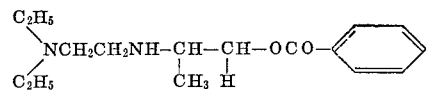

was obtained. The boiling point of the product was 198–203° C. (5 mm. Hg vacuum). [NMR 5.65$\tau$ (multiplet, $>CH-$)].

Example 4

To 0.1 mole of diethylaminoethylamine were added 0.12 mole of propylene oxide and further 0.5 ml. of a $BF_3$ methanol solution (68%). The mixture was placed in a glass autoclave which was then tightly sealed and heated at 100° C. for 5 hours. After the reaction, the reacted mixture was distilled, whereby 0.06 mole of 1-N,N-diethylaminoethylamino-propane-2-ol was obtained. The boiling point of the compound was 155 to 160° C. (5 mm. Hg vacuum). Then, 0.1 mole of the compound was benzoylated according to the conventional method, whereby 0.07 mole of a compound of

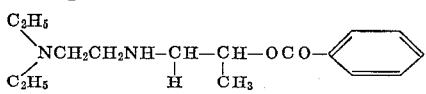

was obtained. The boiling point of the compound was 200 to 205° C. (5 mm. Hg vacuum).

[NMR 4.75τ (multiplet, >CH—)]

Example 5

To 0.1 mole of diethylaminoethylamine were added 0.12 mole of propylene oxide and further 0.01 mole of POcl₃ as a catalyst. The mixture was placed in a glass autoclave which was then tightly sealed, and heated at 80° C. for 10 hours. Then, the reacted mixture was distilled, whereby 0.05 mole of 1-N,N diethylaminoethylamino-propane-2-ol was obtained. Then, this product was benzoylated in the same manner as in Example 4, whereby a compound of

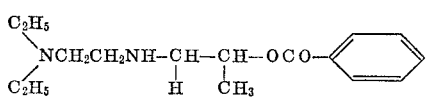

was obtained.

Example 6

To 0.1 mole of diethylaminoethylamine were added 0.12 mole of propylene oxide and further 0.005 mole of trifluoroacetic acid (F₃CCOOH) as a catalyst. The mixture was placed in a glass autoclave which was then tightly sealed, and heated at 60° C. for ten hours. After the reaction, the reacted mixture was distilled, whereby 0.04 mole of 1-N,N diethylaminoethylamino-propane-2-ol was obtained. This compound was benzoylated in the same manner as in Example 4 whereby

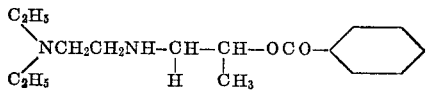

was obtained.

Example 7

To 0.1 mole of cyclohexylamine was added 0.12 mole of propylene oxide, and the mixture was placed in a glass vessel which was then tightly sealed and heated at 100° C. for 5 hours. After the reaction, the product mixture was distilled, whereby 0.07 mole of

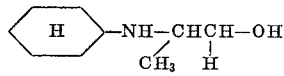

was obtained. The boiling point of this compound was 123–125° (20 mm. Hg vacuum). Then 0.1 mole of this compound was benzoylated according to the conventional method, whereby 0.08 mole of a compound of

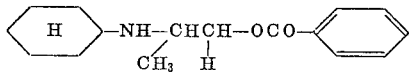

[NMR 6.8τ (multiplet, >CH—)]

was obtained. The melting point of its hydro-chloride was 195–197° C.

What is claimed is:
1. 2-N,N-diethyl ethylenediamino-1-propanol benzoate hydrochloride.
2. The citrate salt of 2-cyclohexylamino-1-propanol-p-ethoxybenzoate.

References Cited

UNITED STATES PATENTS

| | | | |
|---|---|---|---|
| 2,767,207 | 10/1956 | Reasenberg | 260—477 |
| 2,928,845 | 3/1960 | Shapiro et al. | 260—477 |
| 3,337,628 | 8/1967 | Crowther et al. | 260—477 |

OTHER REFERENCES

Vandam: The New England Journal of Medicine 263, 1960, pp. 748–50.

LORRAINE A. WEINBERGER, Primary Examiner

R. S. WEISSBERG, Assistant Examiner

U.S. Cl. X.R.

260—474, 477; 424—308